(12) United States Patent
Jeong et al.

(10) Patent No.: US 10,312,716 B2
(45) Date of Patent: *Jun. 4, 2019

(54) EMI FILTERING AND WIRELESS POWER TRANSFER IN AN ELECTRONIC DEVICE USING A TUNED METALLIC BODY

(71) Applicant: QUALCOMM Incorporated, San Diego, CA (US)

(72) Inventors: Seong Heon Jeong, San Diego, CA (US); Francesco Carobolante, San Diego, CA (US); Charles Edward Wheatley, Del Mar, CA (US); Mark White, II, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/265,395

(22) Filed: Sep. 14, 2016

(65) Prior Publication Data
US 2017/0222467 A1     Aug. 3, 2017

Related U.S. Application Data

(60) Provisional application No. 62/288,685, filed on Jan. 29, 2016.

(51) Int. Cl.
*H02J 7/00* (2006.01)
*H02J 50/12* (2016.01)
(Continued)

(52) U.S. Cl.
CPC .............. *H02J 7/025* (2013.01); *H01F 27/02* (2013.01); *H01F 27/36* (2013.01); *H01F 38/14* (2013.01);
(Continued)

(58) Field of Classification Search
CPC .. H02J 7/025; H02J 7/045; H02J 50/12; H02J 50/80; H01F 27/02; H01F 38/14; H04B 5/0037
(Continued)

(56) References Cited

U.S. PATENT DOCUMENTS 9,827,430 B1 * 11/2017 Von Novak, III ...... H02J 50/00
2007/0145830 A1 * 6/2007 Lee .......................... H02J 5/005
307/135

(Continued)

FOREIGN PATENT DOCUMENTS

| CN | 105119036 A | 12/2015 |
|---|---|---|
| WO | 2010093997 A1 | 8/2010 |
| WO | 2016007234 A1 | 1/2016 |

OTHER PUBLICATIONS

GE Grid Solutions. (n.d.). Metal Enclosed PFC with Harmonic Filters. 1 pg. Retrieved on Jul. 25, 2016 from https://www.gegridsolutions.com/HVMV_Equipment/catalog/metal_pfc_harmonic_htm.

(Continued)

*Primary Examiner* — Phallaka Kik
(74) *Attorney, Agent, or Firm* — Hunter Clark PLLC

(57) ABSTRACT

An apparatus may include an electrically conductive body to magnetically couple to a first magnetic field. A first tuning element may be connected to the electrically conductive body. An electrically conductive coil may be wound about an opening in the electrically conductive body, and configured to magnetically couple to a second magnetic field.

25 Claims, 12 Drawing Sheets

(51) Int. Cl.
*H02J 50/80* (2016.01)
*H01F 27/02* (2006.01)
*H01F 38/14* (2006.01)
*H04B 5/00* (2006.01)
*H02J 7/02* (2016.01)
*H02J 7/04* (2006.01)
*H01F 27/36* (2006.01)
*H02J 5/00* (2016.01)
*H02J 50/10* (2016.01)

(52) U.S. Cl.
CPC .............. *H02J 5/005* (2013.01); *H02J 7/045* (2013.01); *H02J 50/10* (2016.02); *H02J 50/12* (2016.02); *H04B 5/0037* (2013.01); *H04B 5/0081* (2013.01); *H02J 50/80* (2016.02)

(58) Field of Classification Search
USPC .......................................... 320/108, 113, 115
See application file for complete search history.

(56) References Cited

U.S. PATENT DOCUMENTS

| | | | |
|---|---|---|---|
| 2009/0243397 A1 | 10/2009 | Cook et al. | |
| 2012/0112691 A1* | 5/2012 | Kurs | B60L 11/182 320/108 |
| 2012/0235634 A1* | 9/2012 | Hall | H03H 7/40 320/108 |
| 2012/0242159 A1* | 9/2012 | Lou | H03H 7/40 307/104 |
| 2012/0248981 A1* | 10/2012 | Karalis | H03H 7/40 315/70 |
| 2013/0077361 A1* | 3/2013 | Low | H02J 17/00 363/48 |
| 2013/0127252 A1* | 5/2013 | Yerazunis | H01F 38/14 307/104 |
| 2014/0011447 A1* | 1/2014 | Konanur | H04B 5/00 455/41.1 |
| 2014/0027507 A1* | 1/2014 | Jonely | G07C 9/00658 235/382 |
| 2014/0113828 A1* | 4/2014 | Gilbert | H01L 39/126 505/100 |
| 2014/0232197 A1* | 8/2014 | Keeling | H04B 5/0037 307/83 |
| 2014/0334087 A1 | 11/2014 | Nakano et al. | |
| 2014/0361628 A1* | 12/2014 | Huang | H01F 38/14 307/104 |
| 2015/0009077 A1 | 1/2015 | Lee et al. | |
| 2015/0076922 A1 | 3/2015 | Kato et al. | |
| 2015/0130979 A1* | 5/2015 | Huang | H01F 38/14 348/333.01 |
| 2015/0137742 A1* | 5/2015 | Tseng | H02J 7/025 320/108 |
| 2015/0296328 A1* | 10/2015 | van der Lee | H04B 1/3888 455/41.1 |
| 2015/0380827 A1* | 12/2015 | Tahtinen | H01F 38/14 343/702 |
| 2016/0087687 A1* | 3/2016 | Kesler | H04B 5/0037 307/104 |
| 2016/0111889 A1* | 4/2016 | Jeong | H02J 5/005 320/108 |
| 2016/0141887 A1 | 5/2016 | Xue | |
| 2016/0172894 A1 | 6/2016 | Khripkov et al. | |
| 2016/0198070 A1 | 7/2016 | Nakano et al. | |
| 2016/0352149 A1 | 12/2016 | Jeong et al. | |
| 2017/0163094 A1 | 6/2017 | Jeong et al. | |
| 2017/0170689 A1* | 6/2017 | Jeong | H02J 50/80 |
| 2017/0222481 A1* | 8/2017 | Jeong | H02J 7/025 |

OTHER PUBLICATIONS

International Search Report and Written Opinion—PCT/US2016/068829—ISA/EPO—Mar. 24, 2017—24 pgs.

\* cited by examiner

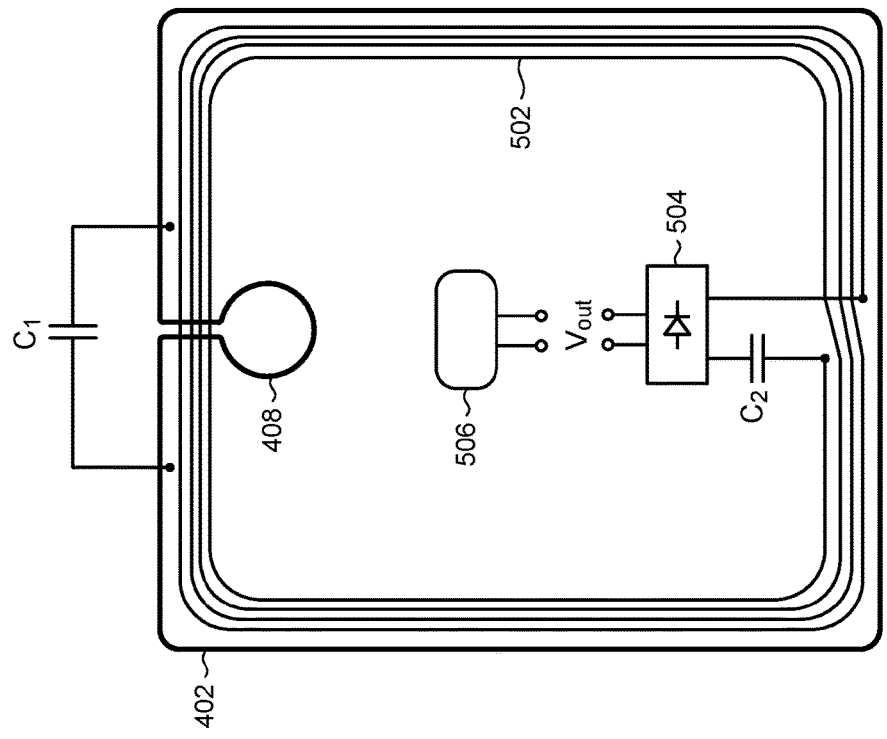
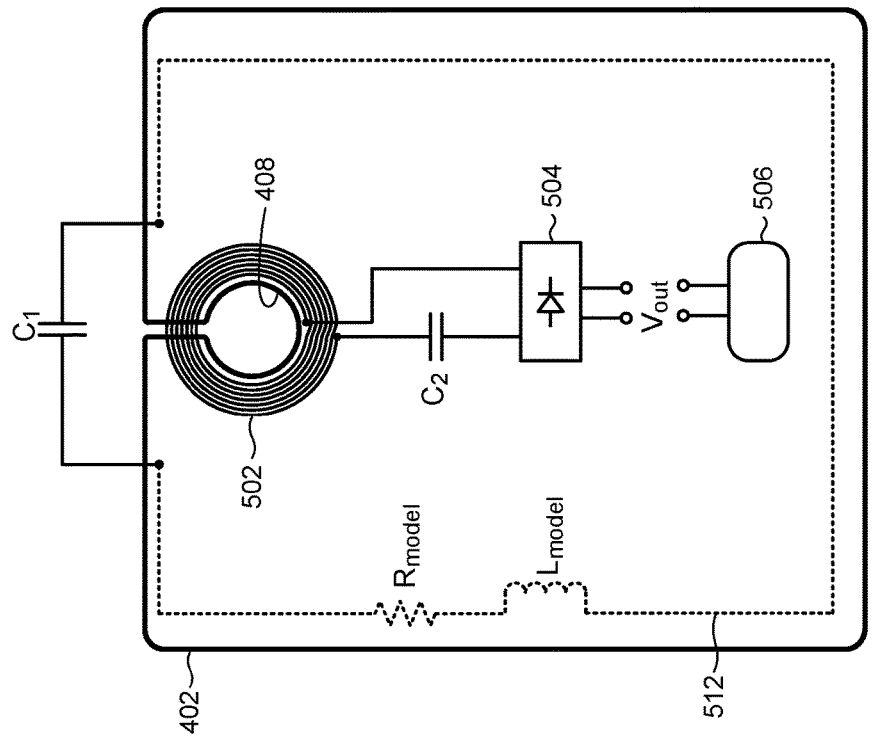
*FIG. 5A*
*FIG. 5*

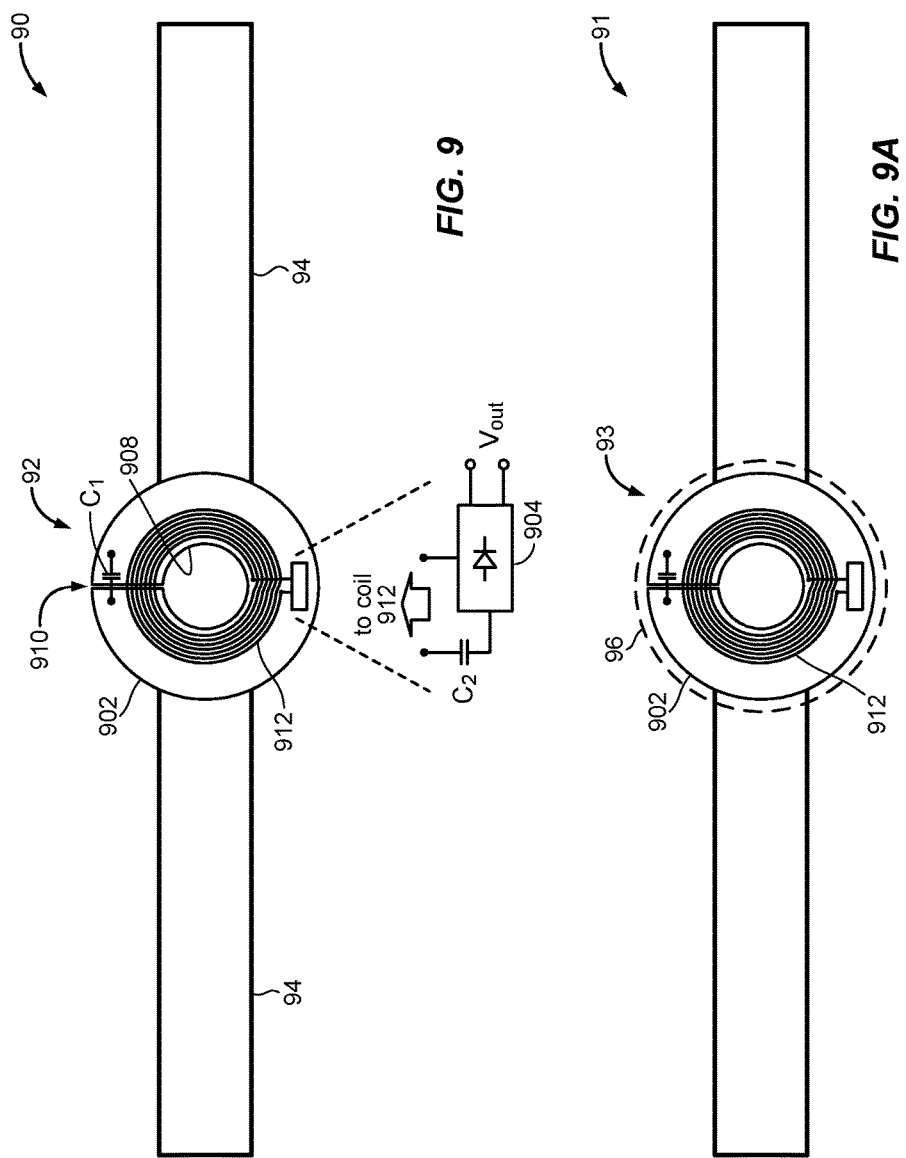

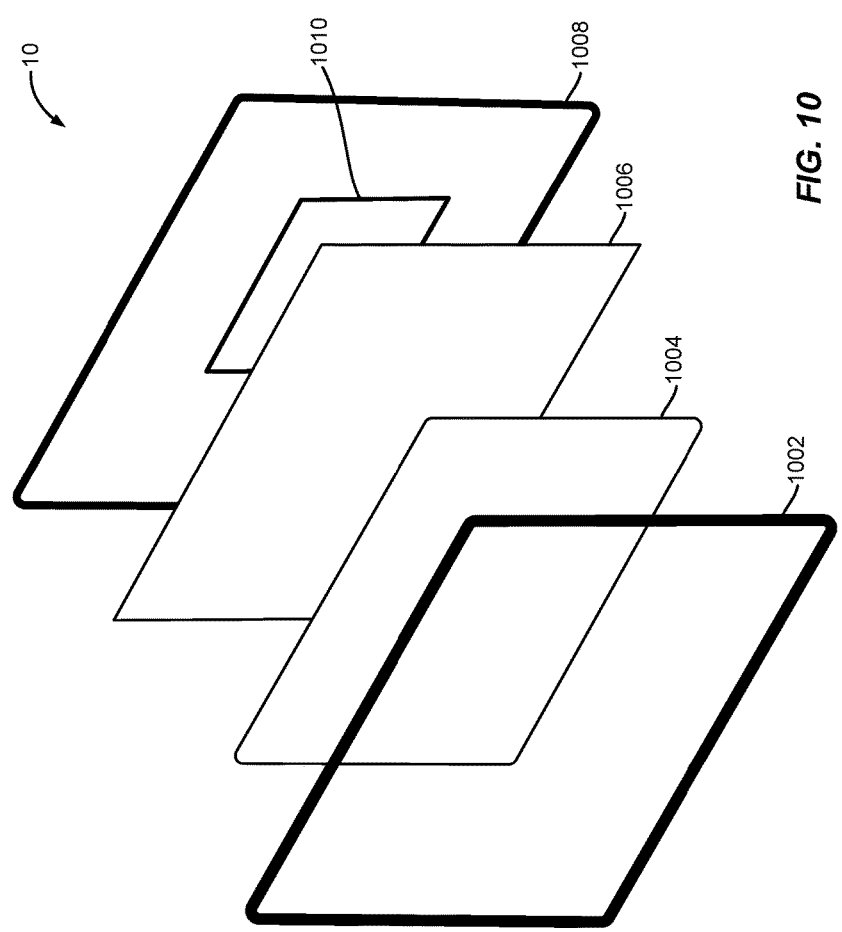

EMI FILTERING AND WIRELESS POWER TRANSFER IN AN ELECTRONIC DEVICE USING A TUNED METALLIC BODY

CROSS REFERENCE TO RELATED APPLICATIONS

Pursuant to 34 U.S.C. § 119(e), this application is entitled to and claims the benefit of the filing date of U.S. Provisional App. No. 62/288,685 filed Jan. 29, 2016, the content of which is incorporated herein by reference in its entirety for all purposes.

TECHNICAL FIELD

The disclosure relates to wireless power transfer, and in particular to filtering electromagnetic interference during wireless power transfer in electronic devices having a tuned metallic body.

BACKGROUND

Wireless power transfer is an increasingly popular capability in portable electronic devices, such as mobile phones, computer tablets, etc. because such devices typically require long battery life and low battery weight. The ability to power an electronic device without the use of wires provides a convenient solution for users of portable electronic devices. Wireless power charging systems, for example, may allow users to charge and/or power electronic devices without physical, electrical connections, thus reducing the number of components required for operation of the electronic devices and simplifying the use of the electronic device.

Wireless power transfer allows manufacturers to develop creative solutions to problems due to having limited power sources in consumer electronic devices. Wireless power transfer may reduce overall cost (for both the user and the manufacturer) because conventional charging hardware such as power adapters and charging chords can be eliminated. There is flexibility in having different sizes and shapes in the components (e.g., magnetic coil, charging plate, etc.) that make up a wireless power transmitter and/or a wireless power receiver in terms of industrial design and support for a wide range of devices, from mobile handheld devices to computer laptops.

When delivering power to an electronic device, whether wirelessly or via a wired connection, electromagnetic interference (EMI) can be an issue. EMI noise may result from the generation of higher harmonics due to non-linear operation in some of the circuitry of the electronic device. In a wireless power transfer configuration, for example, EMI may arise during power conversion in the electronic device (e.g., when the wirelessly received power is being rectified). Typically, an EMI filter may be incorporated on one of the one or more printed circuit boards (PCBs) of the electronic device. However, operation of the EMI filter can result in the generation of heat, which can adversely affect other circuits on the PCB.

SUMMARY

Aspects of the disclosure may include an apparatus having an electrically conductive body configured to magnetically couple to a first magnetic field. A first tuning element may be electrically connected to the electrically conductive body. An electrically conductive coil may be disposed adjacent to the electrically conductive body and wound about an opening in the electrically conductive body. The electrically conductive coil may be configured to magnetically couple to a second magnetic field.

In some embodiments, the first tuning element and the electrically conductive body may define a filter configured to filter harmonics generated by electronic components of the apparatus. The apparatus may further include power conversion circuitry configured to power or charge a load using a received current generated in the electrically conductive coil. The filter circuit may be configured to filter harmonics generated by the power conversion circuitry. The harmonics may fall within a frequency band of a cellular signal received by the apparatus.

In some embodiments, the apparatus may further include at least a first circuit element electrically connected between the electrically conductive body and the electrically conductive coil. The apparatus may further include a second circuit element electrically connected between the electrically conductive body and the electrically conductive coil in parallel with the first circuit element. The first and second circuit elements may be configured to filter harmonics generated by electronic devices comprising the apparatus.

In some embodiments, the second magnetic field may be an externally generated magnetic field. The electrically conductive coil may generate the first magnetic field in response to being coupled to the externally generated magnetic field. The apparatus may further include a rectifier connected to the electrically conductive coil. The rectifier may be configured to rectify current induced in the electrically conductive coil to provide power to electronics that comprise the apparatus. The first tuning element and the electrically conductive body may define a filter configured to filter harmonics generated by the rectifier.

In some embodiments, the apparatus may further include a second tuning element electrically connected to the electrically conductive coil to define a circuit having a resonant frequency substantially equal to a resonant frequency of the electrically conductive body.

In some embodiments, the apparatus may further include a second tuning element electrically connected to the electrically conductive coil to define a circuit having a resonant frequency different from a resonant frequency of the electrically conductive body.

In some embodiments, the apparatus may further include a metallic enclosure to house electronics, the metallic enclosure comprising the electrically conductive body.

In some embodiments, the apparatus may further include a non-metallic enclosure to house electronics that comprise the apparatus, the electrically conductive body and the electrically conductive coil housed within the enclosure.

Aspects of the disclosure may include a method in an electronic device that includes magnetically coupling an externally generated magnetic field to a first power receiving element to produce an induced magnetic field that emanates from the first power receiving element. Power may be produced from the current induced in the first power receiving element. The induced magnetic field may be magnetically coupled to a second power receiving element to induce current in the second power receiving element, the second power receiving element electrically isolated from the first power receiving element. Harmonics coupled to the second power receiving element may be filtered, the harmonics being produced when producing power from the current induced in the first power receiving element.

In some embodiments, the harmonics fall within a frequency band of a cellular signal received by the electronic device.

In some embodiments, magnetically coupling the externally generated magnetic field to the first power receiving element may include inducing current in an electrically conductive coil electrically connected to a first tuning element. Magnetically coupling the induced magnetic field to the second power receiving element may include inducing current in an electrically conductive body electrically connected to a second tuning element. The electrically conductive body may have the shape of an open loop. The electrically conductive body may be a component that comprises a housing of the electronic device.

Aspects of the disclosure may include an apparatus having a housing to enclose electronic components of the apparatus. A first tuning element may be connected to a metallic portion of the housing. The metallic portion of the housing may have a shape that allows a flow of current to be induced therein in response to being magnetically coupled to a first magnetic field. The apparatus may include an electrically conductive coil. A flow of current may be induced in the electrically conductive coil in response to being magnetically coupled to a second magnetic field to produce a flow of current in the electrically conductive coil. A rectifier may be configured to produce power from the flow of current induced in either the metallic portion of the housing or the electrically conductive coil.

In some embodiments, the metallic portion of the housing may include an opening formed therethrough and a slot formed between the opening and a periphery of the metallic portion.

In some embodiments, the rectifier may be electrically connected to the electrically conductive coil. The second magnetic field may be an externally generated magnetic field and the first magnetic field may emanate from the electrically conductive coil in response to the flow of current being induced in the electrically conductive coil.

In some embodiments, the first tuning element and the electrically conductive body may define a filter configured to filter harmonics generated by the rectifier. The harmonics may fall within a frequency band of a cellular signal received by the apparatus.

In some embodiments, the apparatus may further include at least a first circuit element and a second circuit element electrically connected between the electrically conductive body and the electrically conductive coil. The first and second circuit elements may be configured to filter harmonics generated by electronic devices comprising the apparatus.

Aspects of the disclosure may include an apparatus having means for producing a flow of current by magnetically coupling to an externally generated magnetic field, means for rectifying the flow of current in the means for producing to produce power for the apparatus, and means for coupling to a magnetic field generated by the means for producing the flow of current, including means for filtering harmonics generated by the means for rectifying.

In some embodiments, the means for coupling may include a metallic portion of a housing of the apparatus and the means for producing may include an electrically conductive coil.

In some embodiments, the harmonics may fall within a frequency band of a cellular signal received by the apparatus.

In some embodiments, the apparatus may further include second means for filtering harmonics electrically connected between the electrically conductive body and the electrically conductive coil. The second means for filtering harmonics may be configured to filter harmonics generated by the means for rectifying.

Further aspects of the disclosure include an apparatus for wireless power transfer, the apparatus including an electrically conductive body forming a portion of a cover or housing of the apparatus. The electrically conductive body is configured to magnetically couple to a first magnetic field generated by a wireless power transmitter. The apparatus further includes a first tuning element including a capacitor and electrically connected to the electrically conductive body. The apparatus further includes an electrically conductive coil wound about an opening defined by the electrically conductive body. The electrically conductive coil is configured to magnetically couple to a second magnetic field generated by the electrically conductive body. The first tuning element and the electrically conductive body define a filter circuit configured to filter harmonics generated by electronic components of the apparatus.

In some embodiments, the electronic components comprise power conversion circuitry that may include a rectifier, the power conversion circuitry configured to power or charge a load using a received current generated in the electrically conductive coil in response to coupling to the second magnetic field where the filter circuit is configured to filter harmonics generated by the power conversion circuitry.

In some embodiments the filter circuit includes at least one of a low-pass filter having a cutoff frequency of an integer multiple of a fundamental power transfer frequency of the first magnetic field or a notch filter having a center frequency of an integer multiple of the fundamental power transfer frequency.

In some embodiments the apparatus further includes a first reactive element electrically connected between the electrically conductive body and the electrically conductive coil. The apparatus may further include a second reactive element electrically connected between the electrically conductive body and the electrically conductive coil in parallel with the first reactive element.

In some embodiments, the electrically conductive body defines a slot that extends from the opening to a periphery of the electrically conductive body. In some embodiments, the capacitor is electrically connected between a first node on a first side of the slot and a second node on a second side of the slot. In some embodiments, the capacitor is a first capacitor and the apparatus further includes a second capacitor electrically connected between the first node and the electrically conductive coil. In some further embodiments, the apparatus further includes a third capacitor electrically connected between the second node and the electrically conductive coil. In some further embodiments, the apparatus further includes a fourth capacitor electrically connected to the electrically conductive coil.

Further aspects of the disclosure include a method for wireless power transfer in an electronic device. The method includes magnetically coupling to an externally generated magnetic field via an electrically conductive body, that forms a portion of a housing for the electronic device, to produce an induced magnetic field that emanates from the electrically conductive body. The method further includes magnetically coupling to the induced magnetic field via a power receiving element to induce current in the power receiving element to power or charge a load, the second power receiving element being electrically isolated from the electrically conductive body. The method further includes filtering harmonics generated by the power receiving element via a filter circuit including the electrically conductive body electrically connected to a tuning element.

Further aspects of the disclosure include an apparatus for wirelessly receiving power. The apparatus includes a housing configured to enclose electronic components of the apparatus. The housing includes a metallic sheet having a shape that defines an opening therethrough and a slot extending from the opening to a periphery of the metallic sheet. The apparatus further includes a first tuning element electrically connected between a first node on the metallic sheet positioned on a first side of the slot and a second node on the metallic sheet on a second side of the slot, the metallic sheet having a shape that allows a flow of current to be induced therein in response to being magnetically coupled to a first magnetic field. The apparatus further includes an electrically conductive coil wound about the opening and configured such that a flow of current will be induced in the electrically conductive coil in response to being magnetically coupled to a second magnetic field, generated by the flow of current in the metallic sheet, to produce a flow of current in the electrically conductive coil. The apparatus further includes power conversion circuitry configured to produce power from the flow of current induced in the electrically conductive coil. The apparatus further includes a filter circuit comprising the metallic sheet and the first tuning element, the filter circuit configured to filter harmonics generated by the power conversion circuitry.

Further aspects of the disclosure include an apparatus for wireless power transfer. The apparatus includes electrically conductive means for housing the apparatus. The electrically conductive means is configured to magnetically couple to a first magnetic field generated by a wireless power transmitter and to produce a second magnetic field in response thereto. The apparatus further includes means for tuning the electrically conductive means. The apparatus further includes means for magnetically coupling power to power or charge a load from the second magnetic field generated by the electrically conductive means for housing the apparatus. The apparatus further includes means for filtering harmonics via the electrically conductive means and the means for tuning the electrically conductive means.

The following detailed description and accompanying drawings provide a better understanding of the nature and advantages of the disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the disclosure. In this regard, no attempt is made to show implementation details beyond what is needed for a fundamental understanding of the disclosure. The discussion to follow, in conjunction with the drawings, makes apparent to those of skill in the art how embodiments in accordance with the disclosure may be practiced. Similar or same reference numbers may be used to identify or otherwise refer to similar or same elements in the various drawings and supporting descriptions. In the accompanying drawings:

FIGS. 5 and 5A illustrate details of an embodiment in accordance with the disclosure.

FIGS. 9 and 9A illustrate details of a wearable embodiment in accordance with the disclosure.

FIG. 10 illustrates details of a portable computer embodiment in accordance with the disclosure.

DETAILED DESCRIPTION

In the following description, for purposes of explanation, numerous examples and specific details are set forth in order to provide a thorough understanding of the disclosure. The disclosure as expressed in the claims may include some or all of the features in these examples, alone or in combination with other features described below, and may further include modifications and equivalents of the features and concepts described herein.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "power receiving element" to achieve power transfer.

Figure 1:
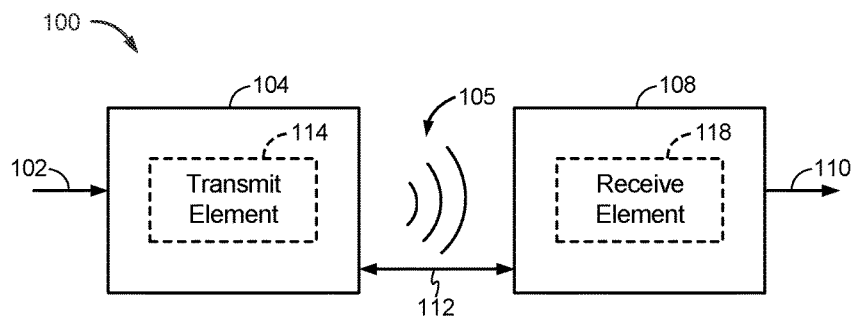
FIG. 1 is a functional block diagram of a wireless power transfer system in accordance with an illustrative embodiment.

FIG. 1 is a functional block diagram of a wireless power transfer system 100, in accordance with an illustrative embodiment. Input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate output power 110 for storing or consumption by a device (not shown in this figure) coupled to the output power 110. The transmitter 104 and the receiver 108 may be separated by a distance 112. The transmitter 104 may include a power transmitting element 114 for transmitting/coupling energy to the receiver 108. The receiver 108 may include a power receiving element 118 for receiving or capturing/coupling energy transmitted from the transmitter 104.

In one illustrative embodiment, the transmitter 104 and the receiver 108 may be configured according to a mutual resonant relationship. When the resonant frequency of the receiver 108 and the resonant frequency of the transmitter 104 are substantially the same or very close, transmission losses between the transmitter 104 and the receiver 108 are reduced. As such, wireless power transfer may be provided over larger distances. Resonant inductive coupling techniques may thus allow for improved efficiency and power transfer over various distances and with a variety of inductive power transmitting and receiving element configurations.

In certain embodiments, the wireless field 105 may correspond to the "near field" of the transmitter 104. The near-field may correspond to a region in which there are strong reactive fields resulting from the currents and charges in the power transmitting element 114 that minimally radiate power away from the power transmitting element 114. The near-field may correspond to a region that is within about one wavelength (or a fraction thereof) of the power transmitting element 114.

In certain embodiments, efficient energy transfer may occur by coupling a large portion of the energy in the wireless field 105 to the power receiving element 118 rather than propagating most of the energy in an electromagnetic wave to the far field.

In certain implementations, the transmitter 104 may output a time varying magnetic (or electromagnetic) field 105 with a frequency corresponding to the resonant frequency of the power transmitting element 114. When the receiver 108 is within the wireless field 105, the time varying magnetic (or electromagnetic) field may induce a current in the power receiving element 118. As described above, if the power receiving element 118 is configured as a resonant circuit to resonate at the frequency of the power transmitting element 114, energy may be efficiently transferred. An alternating current (AC) signal induced in the power receiving element 118 may be rectified to produce a direct current (DC) signal that may be provided to charge or to power a load.

Figure 2:
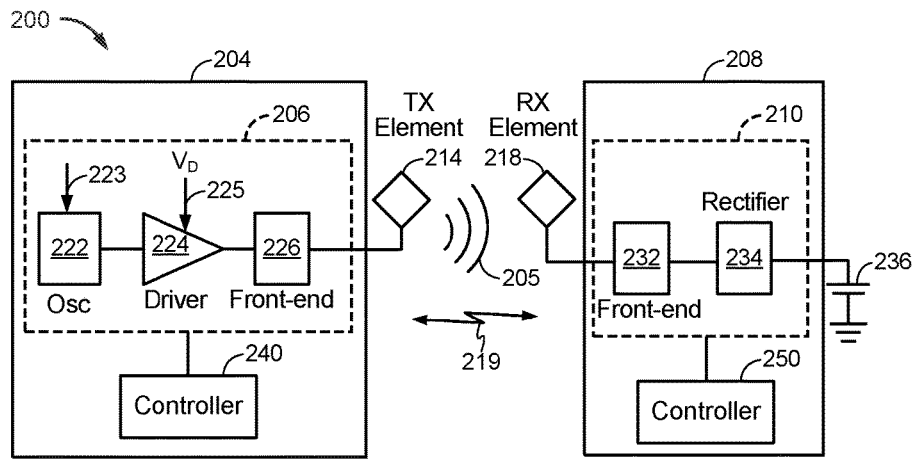
FIG. 2 is a functional block diagram of a wireless power transfer system in accordance with an illustrative embodiment.

FIG. 2 is a functional block diagram of a wireless power transfer system 200, in accordance with another illustrative embodiment. The system 200 may include a transmitter 204 and a receiver 208. The transmitter 204 (also referred to herein as power transfer unit, PTU) may include transmit circuitry 206 that may include an oscillator 222, a driver circuit 224, and a front-end circuit 226. The oscillator 222 may be configured to generate an oscillator signal at a desired frequency that may adjust in response to a frequency control signal 223. The oscillator 222 may provide the oscillator signal to the driver circuit 224. The driver circuit 224 may be configured to drive the power transmitting element 214 at, for example, a resonant frequency of the power transmitting element 214 based on an input voltage signal (VD) 225. The driver circuit 224 may be a switching amplifier configured to receive a square wave from the oscillator 222 and output a sine wave.

The front-end circuit 226 may include a filter circuit configured to filter out harmonics or other unwanted frequencies. The front-end circuit 226 may include a matching circuit configured to match the impedance of the transmitter 204 to the impedance of the power transmitting element 214. As will be explained in more detail below, the front-end circuit 226 may include a tuning circuit to create a resonant circuit with the power transmitting element 214. As a result of driving the power transmitting element 214, the power transmitting element 214 may generate a wireless field 205 to wirelessly output power at a level sufficient for charging a battery 236, or otherwise powering a load.

The transmitter 204 may further include a controller 240 operably coupled to the transmit circuitry 206 and configured to control one or more aspects of the transmit circuitry 206, or accomplish other operations relevant to managing the transfer of power. The controller 240 may be a microcontroller or a processor. The controller 240 may be implemented as an application-specific integrated circuit (ASIC). The controller 240 may be operably connected, directly or indirectly, to each component of the transmit circuitry 206. The controller 240 may be further configured to receive information from each of the components of the transmit circuitry 206 and perform calculations based on the received information. The controller 240 may be configured to generate control signals (e.g., signal 223) for each of the components that may adjust the operation of that component. As such, the controller 240 may be configured to adjust or manage the power transfer based on a result of the operations performed by it. The transmitter 204 may further include a memory (not shown) configured to store data, for example, such as instructions for causing the controller 240 to perform particular functions, such as those related to management of wireless power transfer.

The receiver 208 (also referred to herein as power receiving unit, PRU) may include receive circuitry 210 that may include a front-end circuit 232 and a rectifier circuit 234. The front-end circuit 232 may include matching circuitry configured to match the impedance of the receive circuitry 210 to the impedance of the power receiving element 218. As will be explained below, the front-end circuit 232 may further include a tuning circuit to create a resonant circuit with the power receiving element 218. The rectifier circuit 234 may generate a DC power output from an AC power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205.

The receiver 208 may be configured to determine whether an amount of power transmitted by the transmitter 204 and received by the receiver 208 is appropriate for charging the battery 236. In certain embodiments, the transmitter 204 may be configured to generate a predominantly non-radiative field with a direct field coupling coefficient (k) for providing energy transfer. Receiver 208 may directly couple to the wireless field 205 and may generate an output power for storing or consumption by a battery (or load) 236 coupled to the output or receive circuitry 210.

The receiver 208 may further include a controller 250 configured similarly to the transmit controller 240 as described above for managing one or more aspects of the wireless power receiver 208. The receiver 208 may further include a memory (not shown) configured to store data, for example, such as instructions for causing the controller 250 to perform particular functions, such as those related to management of wireless power transfer.

As discussed above, transmitter 204 and receiver 208 may be separated by a distance and may be configured according to a mutual resonant relationship to minimize transmission losses between the transmitter 204 and the receiver 208.

Figure 3:
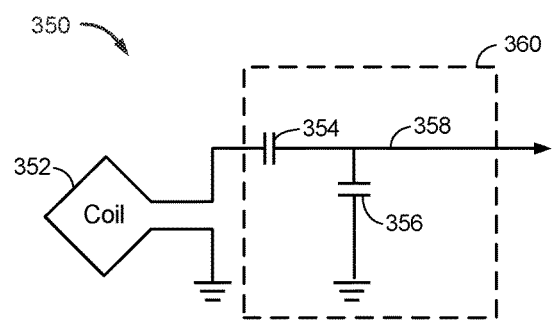
FIG. 3 is a schematic diagram of a portion of transmit circuitry or receive circuitry of FIG. 2 including a power transmitting or receiving element in accordance with an illustrative embodiment.

FIG. 3 is a schematic diagram of a portion of the transmit circuitry 206 or the receive circuitry 210 of FIG. 2, in accordance with illustrative embodiments. As illustrated in FIG. 3, transmit or receive circuitry 350 may include a power transmitting or receiving element 352 and a tuning circuit 360. The power transmitting or receiving element 352 may also be referred to or be configured as an antenna or a "loop" antenna. The term "antenna" generally refers to a component that may wirelessly output or receive energy for coupling to another antenna. The power transmitting or receiving element 352 may also be referred to herein or be configured as a "magnetic" antenna, or an induction coil, a resonator, or a portion of a resonator. The power transmitting or receiving element 352 may also be referred to as a coil or resonator of a type that is configured to wirelessly output or receive power. As used herein, the power transmitting or receiving element 352 is an example of a "power transfer component" of a type that is configured to wirelessly output and/or receive power. The power transmitting or receiving element 352 may include an air core or a physical core such as a ferrite core (not shown in this figure).

When the power transmitting or receiving element 352 is configured as a resonant circuit or resonator with tuning circuit 360, the resonant frequency of the power transmitting or receiving element 352 may be based on the inductance and capacitance. Inductance may be simply the inductance created by a coil and/or other inductor forming the power transmitting or receiving element 352. Capacitance (e.g., a capacitor) may be provided by the tuning circuit 360 to create a resonant structure at a desired resonant frequency. As a non limiting example, the tuning circuit 360 may comprise a capacitor 354 and a capacitor 356, which may be added to the transmit and/or receive circuitry 350 to create a resonant circuit.

The tuning circuit 360 may include other components to form a resonant circuit with the power transmitting or receiving element 352. As another non-limiting example, the tuning circuit 360 may include a capacitor (not shown) placed in parallel between the two terminals of the circuitry 350. Still other designs are possible. In some embodiments, the tuning circuit in the front-end circuit 226 may have the same design (e.g., 360) as the tuning circuit in front-end circuit 232. In other embodiments, the front-end circuit 226 may use a tuning circuit design different than in the front-end circuit 232.

For power transmitting elements, the signal 358, with a frequency that substantially corresponds to the resonant frequency of the power transmitting or receiving element 352, may be an input to the power transmitting or receiving element 352. For power receiving elements, the signal 358, with a frequency that substantially corresponds to the resonant frequency of the power transmitting or receiving element 352, may be an output from the power transmitting or receiving element 352. Although aspects disclosed herein may be generally directed to resonant wireless power transfer, aspects disclosed herein may be used in non-resonant implementations for wireless power transfer.

Figure 4A:
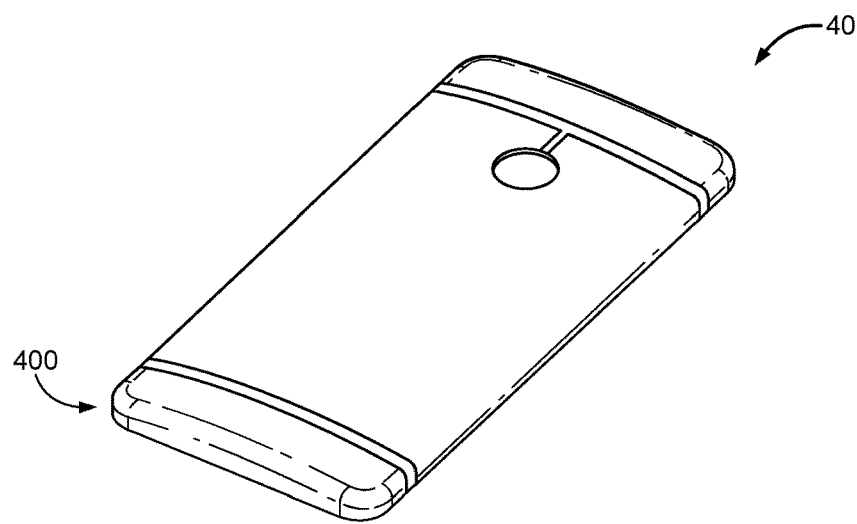
FIGS. 4A and 4B show a back enclosure in accordance with the disclosure.
Figure 4B:
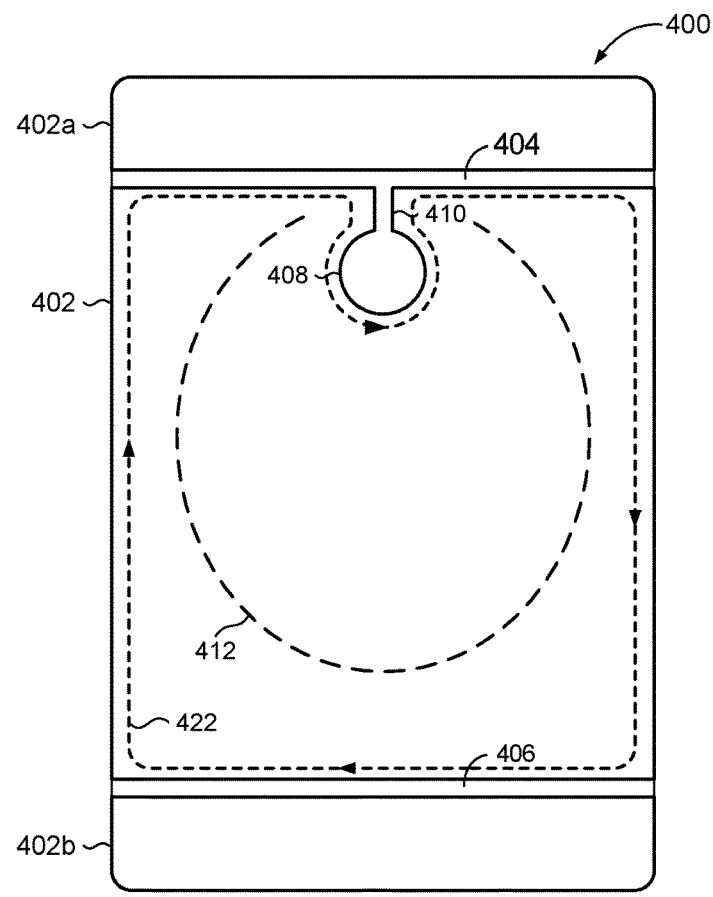

FIGS. 4A and 4B illustrate an example of an electronic device 40 (e.g., smartphone, computer tablet, laptop, etc.) in accordance with the disclosure. The electronic device 40 may include a back enclosure (housing) 400 to house electronics (not shown) that comprise the electronic device 40. In some embodiments, the back enclosure 400 may be metallic (metal back cover, a metallic sheet portion). In some embodiments, the back enclosure 400 may be segmented into several metallic portions 402a, 402, 402b. Portions 402a and 402 may be spaced apart to define a space or gap 404. Communication antennas (not shown) may be aligned relative to the gap 404 to enable the transmission and reception of communication signals. Similarly, portions 402 and 402b may be spaced apart to define a space or gap 406 for additional communication antennas (not shown).

The metallic portion 402 may comprise an electrically conductive body (structure) formed to define a portion of the back enclosure 400. In accordance with the disclosure, the metallic portion 402 may have the shape of an open loop 412 to define a power receiving element. FIG. 4B, for example, shows that metallic portion 402 may define an opening 408 formed through the metallic portion 402. The opening 408, for example, may be used to hold the lens (not shown) of a camera. A slot 410 is defined by and formed through the metallic portion 402 and extending between the opening 408 and an edge at the periphery of the metallic portion 402 may define the open loop 412. The current flow 422 represents a flow of eddy currents, which is explained below.

FIG. 5 is a schematic representation showing additional details of the metallic portion 402 in accordance with aspects of the disclosure. In some embodiments, for example, the metallic portion 402 may be electrically connected to a capacitor $C_1$, thus creating a circuit 512. As depicted in FIG. 5, for example, since the metallic portion 402 is formed in the shape of an open loop 412 (FIG. 4B), the metallic portion 402 may be modeled as a resistance $R_{model}$ connected in series with an inductance $L_{model}$. The capacitor $C_1$ completes the circuit 512.

In some embodiments, a power receiving element 502 may be defined by a multi-turn coil of electrically conductive material wound about the opening 408. The power receiving element 502 may be affixed to or otherwise disposed next to the inside surface of the metallic portion 402. In some embodiments, the power receiving element 502 may be connected to a capacitor $C_2$. It will be appreciated, in various embodiments other circuits or circuit elements may replace capacitor $C_2$. In some embodiments (not shown), the capacitor $C_2$ may be omitted.

In some embodiments, means for rectifying may be connected to the power receiving element 502. For example, a rectifier 504 may be connected to the combination of power receiving element 502 and capacitor $C_2$ to define a circuit that is electrically separate from circuit 512. The rectifier 504 may be any suitable design for rectifying alternating current (AC) signals in the power receiving element 502 to produce a direct current (DC) output voltage $V_{out}$ (DC power). The output voltage $V_{out}$ may be provided to a load (e.g., device electronics) 506 in the electronic device (40, FIG. 4A).

In some embodiments, the coil of electrically conductive material that comprises the power receiving element 502 may wound about the opening 408 adjacent to the opening 408. In other embodiments, the power receiving element 502 may be around about a larger perimeter to encompass a larger area than the opening 408. FIG. 5A, for example, shows the power receiving element 502 may be wound about a periphery of the metallic portion 402. It will be appreciated that in other embodiments, the perimeter of the power receiving element 502 may lie anywhere between the opening 408 and the perimeter of the metallic portion 402.

Figure 6:
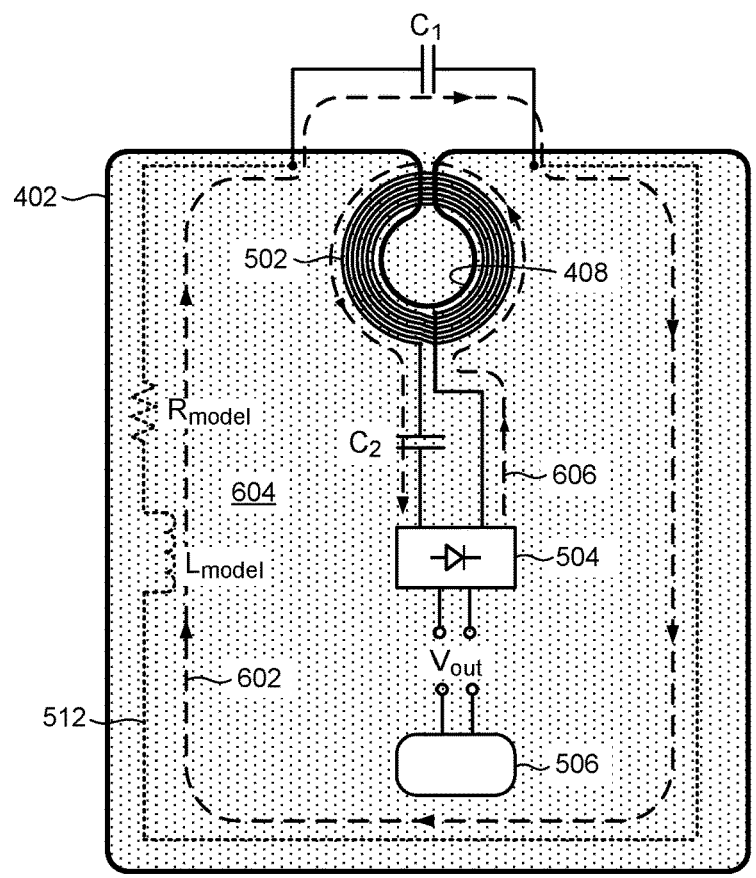
FIG. 6 illustrates eddy currents in an embodiment in accordance with the disclosure.

Referring to FIG. 6, in operation, when the metallic portion 402 is exposed to an externally generated magnetic field (e.g., the wireless field 105 of a wireless power transfer system 100 shown in FIG. 1), the metallic portion 402 can couple to the externally generated magnetic field and in response to the coupling, a flow of current (e.g., eddy currents) may be induced in the metallic portion 402. This flow of current is schematically represented in the figure as a flow of current 602 in circuit 512. For comparison purposes, FIG. 4B shows how induced current 422 may flow in the metallic portion 402 when capacitor $C_1$ is omitted.

Recalling that the metallic portion 402 may be modeled as a series connection of a resistance $R_{model}$ and an inductance $L_{model}$, the capacitor $C_1$ in series connection with the inductance $L_{model}$ may cancel or at least significantly reduce the reactance presented by the inductance $L_{model}$. In principle, if the capacitance of capacitor $C_1$ is properly selected then the reactance components of $L_{model}$ and $C_1$, respectively $j\omega L_{model}$ and $1/j\omega C_1$, would cancel each other, leaving a pure resistance component, namely $R_{model}$. Canceling or at least significantly reducing the reactance components in circuit 512 can increase the flow of current 602 induced in the metallic portion 402 and hence increase wireless power transfer.

The flow of current 602 induced in the metallic portion 402 may in turn create a magnetic field (induced magnetic field) that emanates from the metallic portion 402, which is schematically represented in FIG. 6 by the shaded area 604. The metallic portion 402 may therefore serve as a means for generating a magnetic field, namely the induced magnetic field 604. The power receiving element 502, in turn, can couple to the induced magnetic field 604, resulting in the flow of current 606 in power receiving element 502. The power receiving element 502 may therefore serve as a means for producing the flow of current 606.

The flow of current 606 induced in the power receiving element 502 may be rectified using a suitable rectifier (e.g., rectifier 504) to produce a DC voltage $V_{out}$, which can be used to power the load 506 (e.g., device electronics, battery, etc.). Accordingly, a properly selected capacitor $C_1$ can maximize the induced flow of current 602 in metallic portion 402, which in turn can maximize the induced magnetic field 604 that can be coupled by power receiving element 502.

In accordance with the disclosure, a resonant frequency of the metallic portion 402 may be tuned by a suitable selection of capacitance for capacitor $C_1$ ("tuning" the metallic portion 402) to set a resonant frequency of circuit 512. At resonance, the reactive components $L_{model}$ and $C_1$ substantially cancel at a particular frequency. Likewise, a resonant frequency of the power receiving element 502 may be tuned by a suitable selection of capacitance for capacitor $C_2$ to set a resonant frequency of the circuit comprising the power receiving element 502.

Figure 6A:
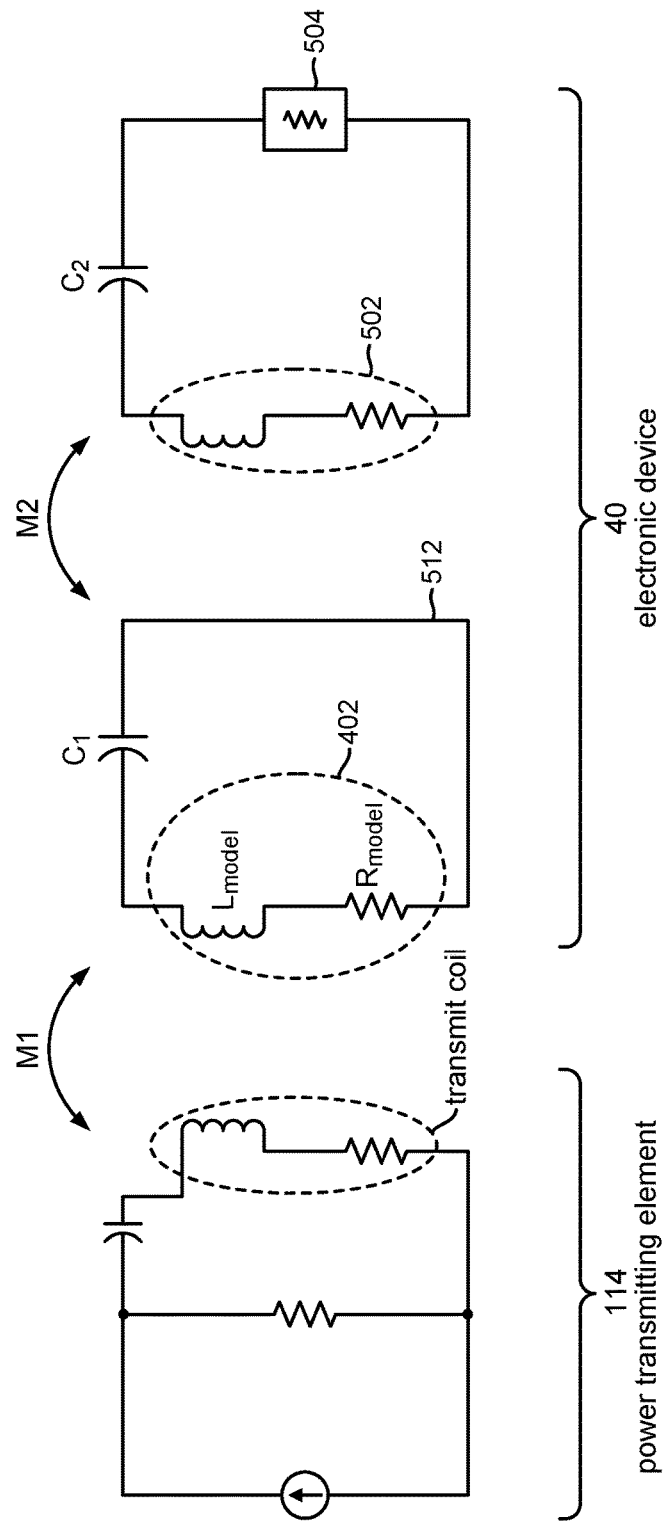
FIG. 6A illustrates the arrangement shown in FIG. 6 as a three-coil coupling configuration.

Referring to FIG. 6A, in accordance with the disclosure, power transfer (e.g., amount of power delivered and efficiency of delivery) from a transmit coil (e.g., in a power transmitting element 114, FIG. 1) to the power receiving element 502 may be controlled by varying a mutual inductance M1 (and hence the coupling) between the transmit coil and the metallic portion 402 and/or a mutual inductance M2 between the metallic portion 402 and the power receiving element 502. For example, the coupling between the transmit coil and the power receiving element 502 may be maximized for power transfer by maximizing both the mutual inductance M1 between the transmit coil and the metallic portion 402 and the mutual inductance M2 between the metallic portion 402 and the power receiving element 502. Maximum mutual inductance can be achieved by setting the resonant frequency of both the metallic portion 402 and the power receiving element 502 to be substantially equal to a frequency of the externally generated magnetic field generated by the transmit coil.

In some situations, less than maximum power transfer may be desirable. The degree of power transfer may be controlled by lowering the mutual inductance. For example, the resonant frequency of the metallic portion 402 may be set to a frequency different from frequency of the externally generated magnetic field (referred to as being "off resonance") to reduce the mutual inductance M1 between the transmit coil and the metallic portion 402, while leaving the resonant frequency of the power receiving element 502 substantially equal to the frequency of the externally generated magnetic field. Reducing the mutual inductance M1 between the transmit coil and the metallic portion 402 may have an overall effect of reducing the power transfer from the transmit coil to the power receiving element 502. Conversely, the resonant frequency of the metallic portion 402 may remain substantially equal to the frequency of the externally generated magnetic field, while the resonant frequency of the power receiving element 502 may be set to a frequency different from the frequency of the externally generated magnetic field to reduce the mutual inductance M2 between the metallic portion 402 and the power receiving element 502. In some embodiments, both the mutual inductance M2 between the transmit coil and the metallic portion 402 and the mutual inductance between the metallic portion 402 and the power receiving element 502 may be reduced, for example, by tuning both the metallic portion 402 and the power receiving element 502 to be off resonance with respect to the frequency of the externally generated magnetic field.

Figure 7:
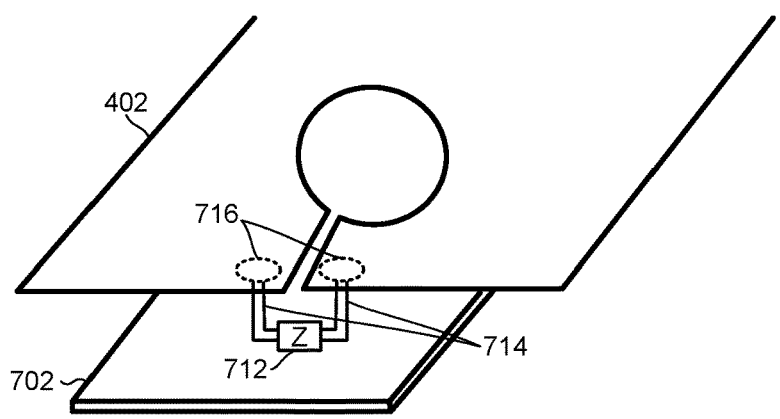
FIG. 7 shows a particular implementation of an embodiment in accordance with the disclosure.

Referring back to FIGS. 5, 5A, and 6, the schematic representations depict capacitor $C_1$ electrically connected to the metallic portion 402. In some embodiments, the capacitor C1 may be directly connected (e.g., soldered) to the metallic portion 402. In other embodiments, directly attaching the capacitor $C_1$ to the metallic portion 402 may not be practical. FIG. 7, therefore, illustrates an example of a particular implementation of tuning the metallic portion 402 using capacitor $C_1$ in accordance with other embodiments of the disclosure. A tuning element 712 may be disposed on a printed circuit board (PCB) 702 comprising the device electronics of an electronic device (e.g., 40, FIG. 4A). Connectors 714 (e.g., pogo pins) attached to the PCB 702 and connected to the tuning element 712 may extend from the tuning element 712 to make electrical contact with contact points 716 formed on the metallic portion 402, thus electrically connecting the tuning element 712 to the metallic portion 402.

In various embodiments, the tuning element 712 may be any suitable circuitry or circuit element. In some embodiments, for example, the tuning element 712 may be a capacitor, such as capacitor $C_1$ (FIG. 5). In other embodiments, the tuning 712 element may include a variable capacitor, a network of capacitors including series-connected capacitors, parallel-connected capacitors, and so on. As mentioned above, the metallic portion 402 has an inductance $L_{model}$ (FIG. 5) associated with it by virtue of its loop shape 412 (FIG. 4B). In some embodiments, the inductance of the metallic portion 402 may be changed. Accordingly, in some embodiments, the tuning element 712 may include one or more inductive elements to increase or decrease the total inductance presented by the metallic portion 402 and tuning element 712.

In accordance with the disclosure, the roles of the metallic portion 402 and the power receiving element 502 may be reversed. Referring to FIG. 8, for example, in some embodiments the metallic portion 402 may serve as a power receiving element 802. A rectifier 814 may be connected to the metallic portion 402 to define a circuit 812. In some embodiments, a tuning capacitor $C_1$ (or other tuning circuit) may be added to the circuit 812, for example, to tune a resonant frequency of the circuit 812. A means for generating a magnetic field may include a coil 804 of electrically conductive material wound about the opening 408. A capacitor $C_2$ may be connected to the coil 804 to tune a resonant frequency of the circuit defined by the coil 804 and capacitor $C_2$.

As described above, power transfer from a transmit coil (e.g., power transmitting element 114, FIG. 1) to the power receiving element 802 may be controlled by controlling the mutual inductance between the transmit coil and the power receiving element 802 and/or the mutual inductance between the power receiving element 802 and the coil 804. For example, the power receiving element 802 may be tuned (e.g., by tuning $C_1$) to be resonant or off-resonance with respect to the frequency of an external magnetic field generated by the transmit coil in order to alter the mutual inductance between the transmit coil and the power receiving element 802. Likewise, the coil 804 may be tuned (e.g., by tuning $C_2$) to be resonant or off-resonance with respect to the frequency of the external magnetic field in order to alter the mutual inductance between the power receiving element 802 and the coil 804.

Figure 8A:
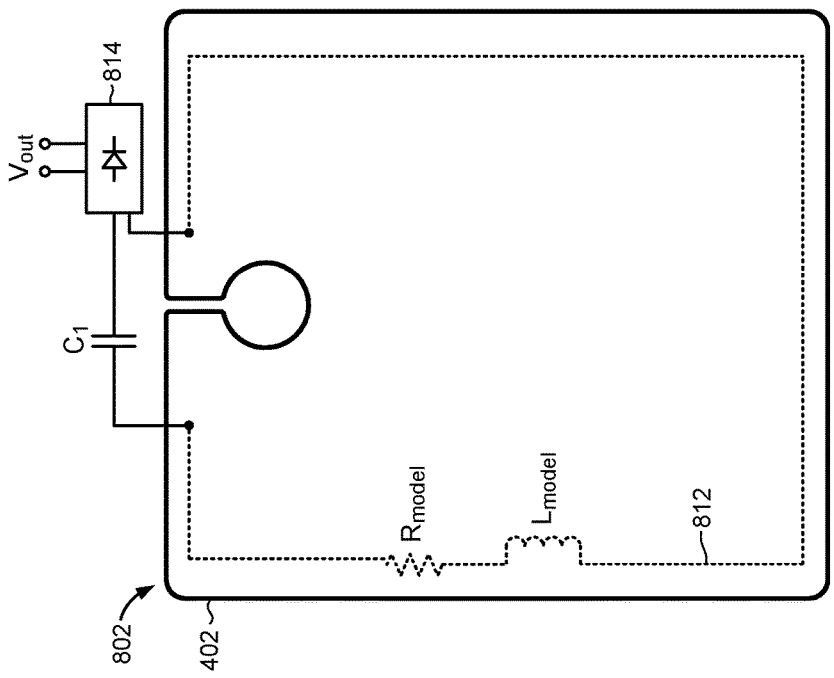
FIGS. 8 and 8A illustrate alternative embodiments in accordance with the disclosure.
Figure 8:
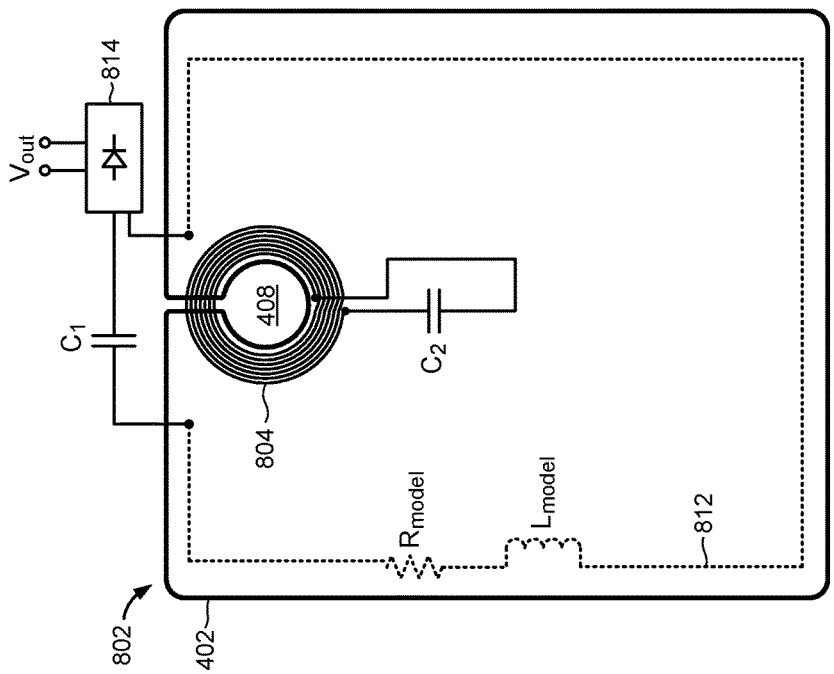

Referring to FIG. 8A, in other embodiments, the coil 804 may be omitted, leaving only the resonant circuit 812 comprising the power receiving element 802 (realized using the metallic portion 402), and the capacitor C1 and rectifier 814.

Referring to FIGS. 9 and 9A, embodiments in accordance with the disclosure may include a wearable electronic device. In some embodiments, for example, a wearable electronic device 90 may include a device body 92 connected to a fastener 94. The wearable electronic device 90 may be a smartwatch, a fitness monitoring device, and so on.

The device body 92 may include a metallic portion 902. The metallic portion 902 may have an open loop shape defining a central opening 908 and a slot 910 that connects the opening 908 and a periphery of the metallic portion 902. A capacitor $C_1$ may be connected to the metallic portion 902 to define a circuit, tuned by the capacitor $C_1$. The device body 92 may include a power receiving element (e.g., coil) 912 wound about the opening 908. The power receiving element 912 may be connected to a capacitor $C_2$ (e.g., to tune the power receiving element 912), and to a rectifier 904 to produce a DC voltage $V_{out}$ using the flow of current induced in the power receiving element 912 when exposed to an externally generated magnetic field.

In some embodiments, the metallic portion 902 may serve as a housing to house the device electronics (not shown) that comprise the wearable electronic device 90. Referring to FIG. 9A, in other embodiments, a wearable electronic device 91 may include a device body 93 that may include a non-metallic housing 96 to house the metallic portion 902 and the power receiving element 912.

As described above, power transfer from a transmit coil (e.g., power transmitting element 114, FIG. 1) to the power receiving element 912 may be controlled by controlling the mutual inductance between the transmit coil and the power receiving element 912 and/or the mutual inductance between the power receiving element 912 and the metallic portion 902. For example, the power receiving element 912 may be tuned (e.g., by tuning $C_2$) to be resonant or off-resonance with respect to the frequency of an external magnetic field generated by the transmit coil in order to alter the mutual inductance between the transmit coil and the power receiving element 912. Likewise, the metallic portion 902 may be tuned (e.g., by tuning $C_1$) to be resonant or off-resonance with respect to the frequency of the external magnetic field in order to alter the mutual inductance between the power receiving element 912 and the metallic portion 902.

Referring to FIG. 10, embodiments in accordance with the disclosure may include portable computers; e.g., laptop computers, computer tablets, and the like. In some embodiments, for example, a portable computer 10 may comprise a front enclosure 1002 and a back enclosure 1008 to house a display 1004 and device electronics (e.g., circuitry, battery, etc.) 1006, and a wireless power receiver 1010. The back enclosure 1008 may be a non-metallic material in order not to interfere with the wireless power receiving function. Details of the wireless power receiver 1010 in accordance with the disclosure will now be described.

Figure 11A:
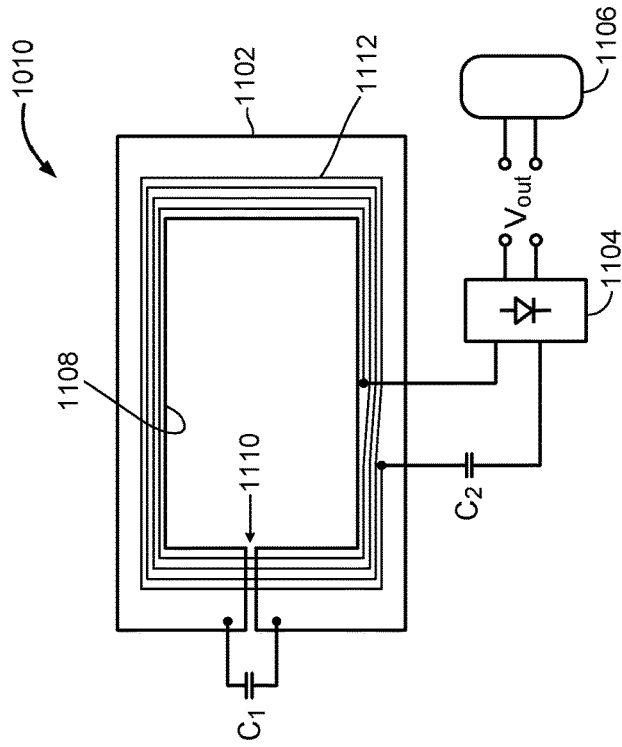
FIGS. 11A and 11B show details of an embodiment in accordance with the disclosure.
Figure 11B:
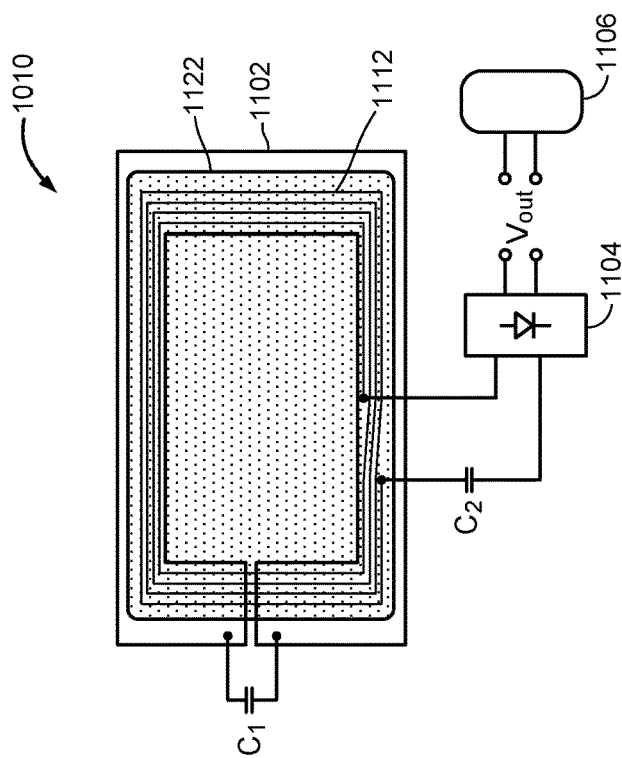

FIGS. 11A and 11B are schematic representations showing details of a wireless power receiver 1010 in accordance with embodiments of the disclosure. The wireless power receiver 1010 may include a metallic portion 1102 having the shape of an open loop defining an opening 1108 and a slot 1110 that extends between the opening 1108 and a periphery of the metallic portion 1102. A power receiving element (e.g., coil) 1112 may be wound about the opening 1108. A rectifier 1104 may be connected to the power receiving element 1112 to produce a DC voltage $V_{out}$ from a flow of current that can arise in the power receiving element 1112 in response to an externally generated magnetic field.

A ferrite layer 1122 may be disposed between the power receiving element 1112 and the device electronics 1006, in order to prevent magnetic fields that can be generated by the power receiver 1010 from coupling to the device electronics 1006. The ferrite layer 1122 is omitted in FIG. 11B to more clearly illustrate details of the metallic portion 1102.

A capacitor $C_1$ may be used to tune the metallic portion 1102 to be in resonance with an externally generated magnetic field or out of resonance with the externally generated magnetic field in order to alter the mutual inductance between the metallic portion 1102 and the transmit coil. Similarly, a capacitor $C_2$ may be used to tune the power receiving element 1112 to be in resonance or out of resonance with the externally generated magnetic field in order to alter the mutual inductance between the power receiving element 1112 and the metallic portion 1102.

In accordance with embodiments of the disclosure, the power receiver 1010 may have an area that is smaller than the area of the portable computer 10 shown in FIG. 10. In some embodiments, the area of the power receiver 1010 may be less than 50% of the area of the portable computer 10. Due to the amplifying effect that of the tuned metallic portion 1102, the coil 1112 may couple more strongly to an externally generated magnetic field and thus achieve a greater power transfer than in a wireless power transfer system that does not use an amplifying element such as the tuned metallic portion 1112. Accordingly, the power receiver 1010 may be smaller and still achieve a similar power transfer as compared to larger wireless power transfer systems.

Figure 12A:
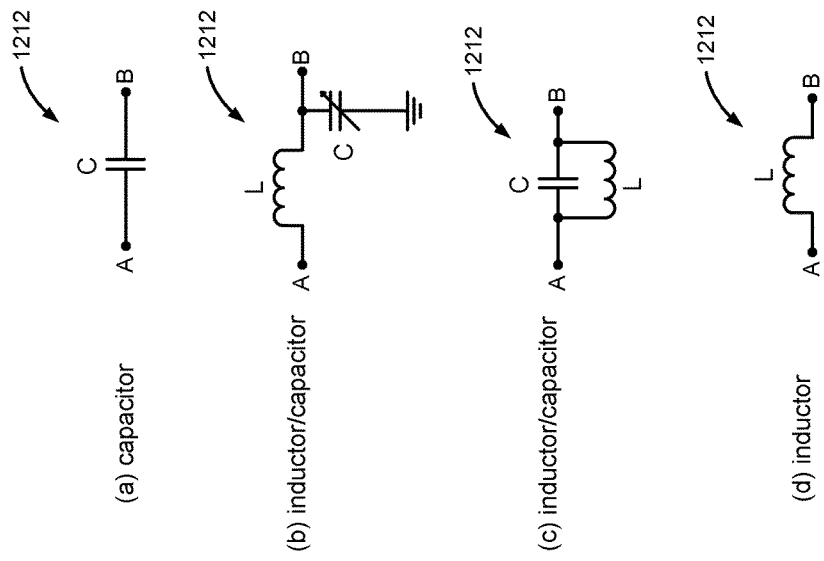
FIGS. 12 and 12A illustrate aspects of a tuning element in accordance with embodiments of the disclosure and FIG. 12B illustrates an equivalent circuit model.
Figure 12:
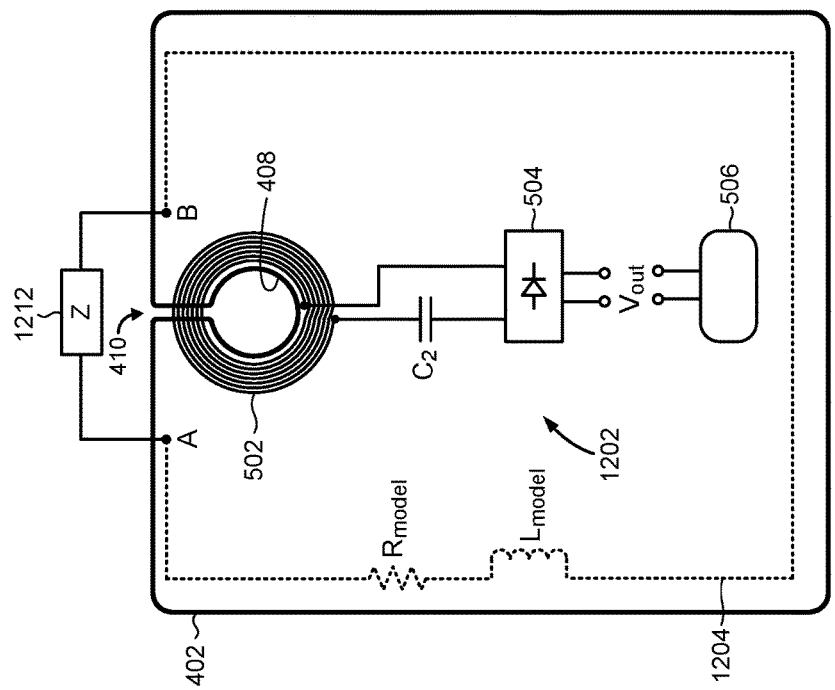

In some embodiments in accordance with the disclosure, the metallic portion 402 (FIG. 4B) of an electronic device 40 (FIG. 4A) may be used for RF filtering to remove or at least reduce electromagnetic interference (EMI) that may arise when transferring power to the electronic device 40. Referring to FIG. 12, circuit 1202 comprising power receiving element 502 and rectifier 504 may produce a rectified output $V_{out}$. EMI may arise in circuit 1202 when power received by power receiving element 502 is rectified by rectifier 504 to produce $V_{out}$. EMI produced in circuit 1202 may be radiated via power receiving element 502. The EMI produced in circuit 1202 may also couple to the metallic portion 402 (coupled EMI) by virtue of the mutual coupling between the power receiving element 502 and the metallic portion 402. This coupled EMI can be re-radiated from the metallic portion 402, and in particular the coupled EMI may radiate from the slot 410 formed in the metallic portion 402.

As explained above and shown in FIG. 12, the metallic portion 402 may be formed in the shape of a loop and thus may be modeled by an equivalent circuit 1204 comprising a resistance $R_{model}$ connected in series with an inductance $L_{model}$. A tuning element 1212 may complete the circuit 1204. In accordance with some embodiments of the disclosure, the tuning element 1212 may comprise any suitable network of one or more capacitors, inductors, or both capacitors and inductors. In some embodiments, the capacitors and/or inductors may be variable elements.

In accordance with the disclosure, the tuning element 1212, in conjunction with the metallic portion 402, may be configured to define a filter to filter harmonic frequencies that can contribute to EMI. As can be seen in FIG. 12, for example, the tuning element 1212 may define a filter in conjunction with the resistance $R_{model}$ and inductance $L_{model}$ of the metallic portion 402 that can be tuned to filter EMI. The tuning element 1212 may be any suitable circuit. Merely to illustrate this point, FIG. 12A shows various examples (a)-(d) of tuning element 1212. In example (a), the tuning element 1212 may be a capacitor C to configure the circuit 1204 in FIG. 12 as an RLC bandpass filter. The capacitor C may be a fixed value capacitor, a variable capacitor, a network of capacitors, and the like. In some embodiments, the cutoff frequency of the RLC bandpass filter may be set (e.g., by setting the capacitance of capacitor C) to filter EMI frequencies that may arise during wireless power transfer. Example (b) shows that in some embodiments, the tuning element 1212 may include an inductor L in addition to the $L_{model}$ to define an RLC filter. For example, example (b) may be used to increase the total inductance of circuit 1204. Capacitor C may be a fixed value capacitor, or as shown in example (b) capacitor C may be tunable. Example (c) shows a network of a capacitor C in parallel with an inductor L. Still other topologies are possible. In example (d), the tuning element 1212 may include one or more inductors L to increase the total inductance in the circuit 1204.

Figure 12B:
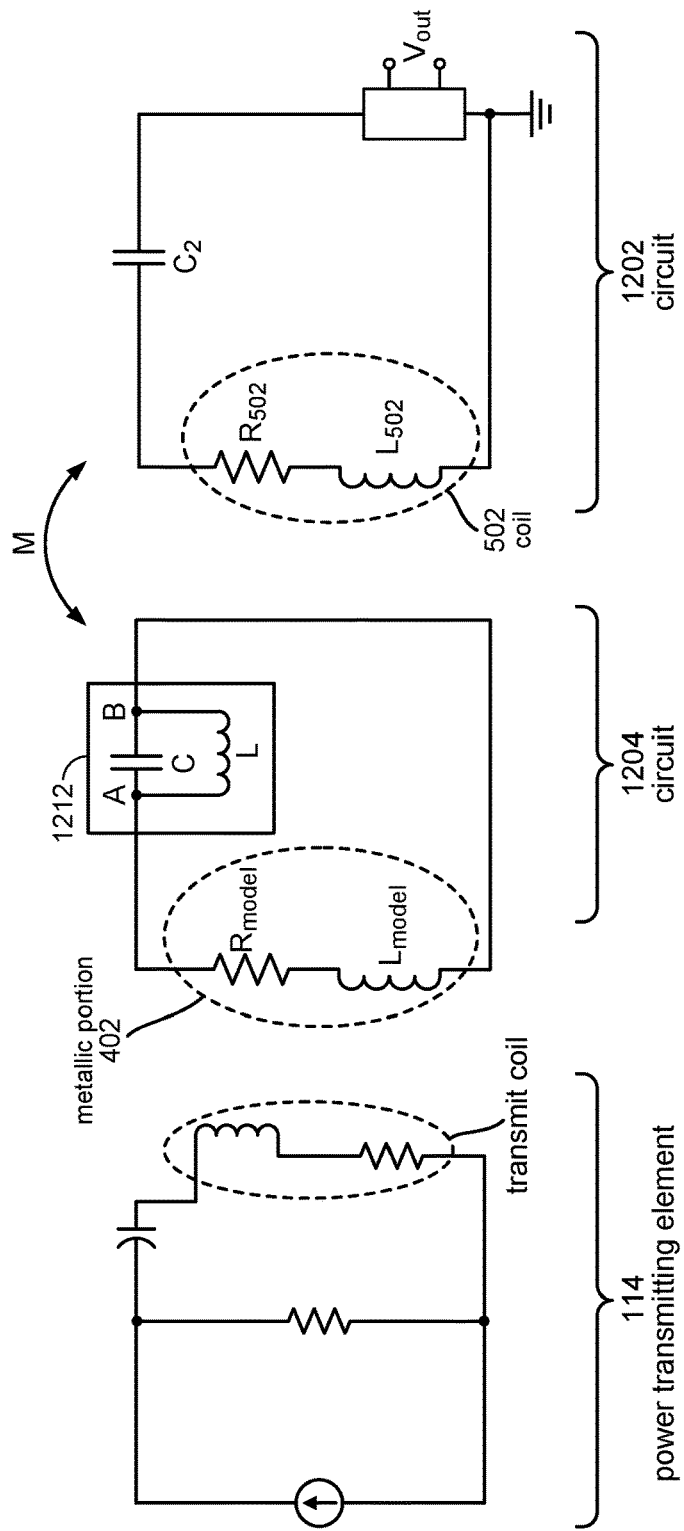

Operation to provide EMI filtering in accordance with the disclosure will be explained in terms of the equivalent circuit model shown in FIG. 12B. In the power transmit unit (e.g., 114, FIG. 1), the transmit coil may be represented as an inductor in series with a resistive element. The metallic portion 402 may be represented by resistance $R_{model}$ and inductance $L_{model}$. In the example shown, tuning element 1212 may comprise a parallel combination of capacitor C and inductor L to complete the circuit 1204. Power receiving element 502 may be represented by resistance $R_{502}$ and inductance $L_{502}$. As explained above, EMI produced in circuit 1202 may couple to the metallic portion 402 (coupled EMI) by virtue of the mutual coupling between the power receiving element 502 and the metallic portion 402. The coupled EMI may be re-radiated by the metallic portion 402.

Accordingly, in some embodiments, the tuning element 1212 may be configured to define a filter with the metallic portion 402 that can attenuate the radiation of the coupled EMI. In some embodiments, the filter may be a low-pass filter having a predetermined cutoff frequency. In other embodiments, the filter may be a notch filter having a predetermined center frequency. In some embodiments, the cutoff frequency (or center frequency in the case of a notch filter) may be determined based on the frequency band of a frequency assigned for cellular phone use. For example, 800 MHz, 850 MHz, and 900 MHz frequency bands, and higher, are typically used for the transmission and reception of cellular signals. EMI energy in these frequency bands can therefore interfere with cellular communications. This interference can be significant because the received cellular signal strength can be smaller than the EMI energy that falls within the frequency bands used for cellular communications.

In accordance with the disclosure, the tuning element 1212 may be configured to define a filter with the metallic portion 402 having a cutoff frequency or center frequency that falls within a frequency band used for cellular communications. In some embodiments, for example, the filter defined by tuning element 1212 may be a low-pass filter having a cutoff frequency defined by n×the fundamental power transfer frequency, where n may be an integer of 1 or greater. In other embodiments, the filter may be a notch filter having a center frequency defined by n×the fundamental power transfer frequency. In a particular embodiment, for example, a frequency of 6.78 MHz for wireless power transfer may be specified, so the fundamental power transfer frequency would be 6.78 MHz. In various embodiments, n may be any suitable value to filter out EMI frequencies that are harmonics of the fundamental power transfer frequency. For example, n may be 118 (i.e., $118^{th}$ harmonic) in some embodiments to filter out EMI energy in the 800 MHz range, while n may be 132 in other embodiments to filter out EMI energy in the 900 MHz range, and so on.

Figure 13A:
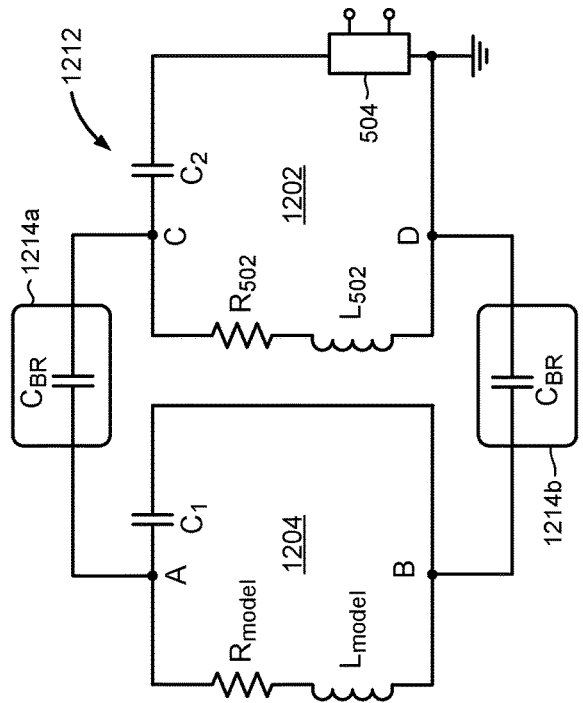
FIGS. 13 and 13A illustrate details of an embodiment in accordance with the disclosure.
Figure 13:
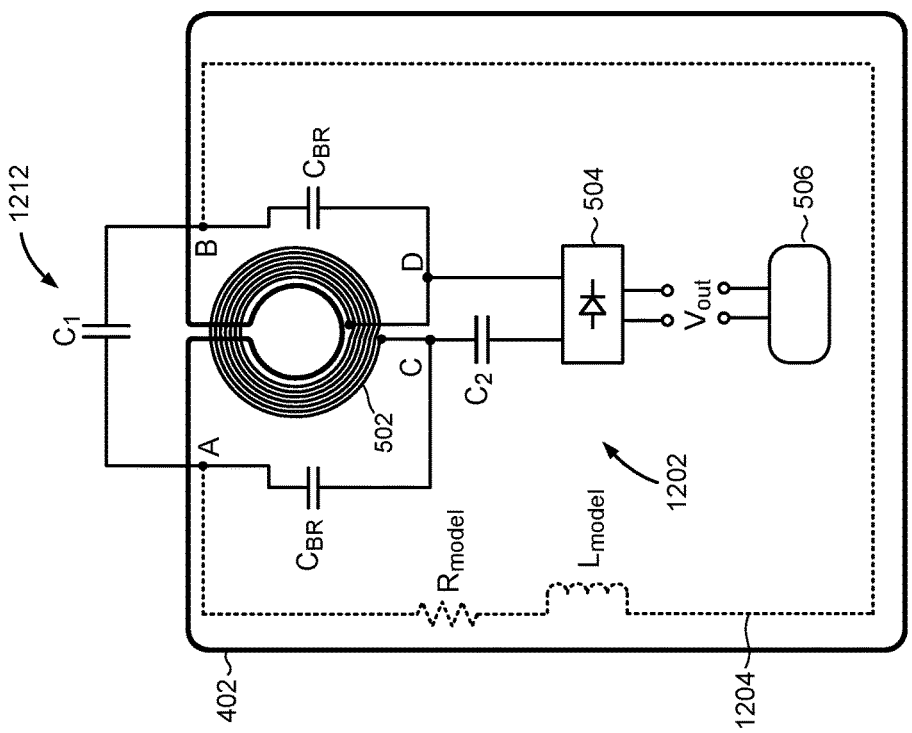

FIG. 13 illustrates another configuration to provide filtering of EMI frequencies that can interfere with received cellular signals. In some embodiments, first and second reactive elements shown as bridging capacitors $C_{BR}$ may be provided to bridge the metallic portion 402 and the power receiving element 502. The bridging capacitors $C_{BR}$ may attenuate the coupling of EMI to the metallic portion 402. The bridging capacitors $C_{BR}$ may be selected to define a cutoff frequency defined by n×the fundamental power transfer frequency (e.g., an integer multiple of the power transfer frequency). As explained above, n may be selected to attenuate the coupling of EMI energy to the metallic portion 402 in the frequency bands used for cellular communications.

FIG. 13A shows an equivalent circuit that represents the configuration shown in FIG. 13. For example, circuit 1204 in FIG. 13A may represent the metallic portion 402 and capacitor $C_1$ combination shown in FIG. 13, including the resistance ($R_{model}$) and inductance ($L_{model}$) of the metallic portion 402. Circuit 1202 may represent power receiving element 502 and capacitor $C_2$, showing the resistance ($R_{502}$) and inductance ($L_{502}$) of the power receiving element 502. Nodes A (e.g., first node), B (e.g., second node), C (e.g., third node), D (e.g., fourth node) shown in FIGS. 13 and 13A are provided for reference.

The bridging capacitors $C_{BR}$ shown in FIGS. 13 and 13A represent a first order implementation of filtering. In other embodiments, the bridging capacitors $C_{BR}$ may be replaced with more complex circuitry (e.g., networks of other capacitors or combination of inductors and/or capacitors), represented in FIG. 13A as tuning elements 1214a, 1214b. The tuning elements 1214a, 1214b (e.g., bridging capacitors $C_{BR}$) may comprise higher order filters, active circuits, and so on. The tuning circuits 1214a, 1214b may comprise the same circuit design to provide balanced operation; for example, to reduce common mode effects. However, in some embodiments tuning elements 1214a, 1214b may be designed to have different characteristics. In some embodiments, the tuning elements 1214a, 1214b may include programmable components to enable tuning in real time; e.g., during operation of the electronic device 40 (FIG. 4A).

Other Considerations

The above description illustrates various embodiments of the disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the disclosure as defined by the claims.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Further, more than one invention may be disclosed.

What is claimed is:

1. An apparatus for wireless power transfer, the apparatus comprising:
   an electrically conductive body forming a portion of a cover or housing of the apparatus, the electrically conductive body configured to magnetically couple to a first magnetic field generated by a wireless power transmitter;
   a first tuning element comprising a capacitor and electrically connected to the electrically conductive body; and
   an electrically conductive coil wound about an opening defined by the electrically conductive body, the electrically conductive coil configured to magnetically couple to a second magnetic field generated by the electrically conductive body, the first tuning element and the electrically conductive body defining a filter circuit configured to filter harmonics generated by electronic components of the apparatus.

2. The apparatus of claim 1, wherein the electronic components comprise power conversion circuitry configured to power or charge a load using a received current generated in the electrically conductive coil in response to coupling to the second magnetic field, wherein the filter circuit is configured to filter harmonics generated by the power conversion circuitry.

3. The apparatus of claim 2, wherein the power conversion circuitry comprises a rectifier configured to rectify current induced in the electrically conductive coil to provide power to the load, wherein the filter circuit is configured to filter harmonics generated by the rectifier.

4. The apparatus of claim 1, wherein the harmonics fall within a frequency band of a cellular signal received or transmitted by the apparatus.

5. The apparatus of claim 1, wherein the filter circuit comprises at least one of:
   a low-pass filter having a cutoff frequency of an integer multiple of a fundamental power transfer frequency of the first magnetic field; or
   a notch filter having a center frequency of an integer multiple of the fundamental power transfer frequency.

6. The apparatus of claim 1, further comprising a first reactive element electrically connected between the electrically conductive body and the electrically conductive coil.

7. The apparatus of claim 6, further comprising a second reactive element electrically connected between the electrically conductive body and the electrically conductive coil in parallel with the first reactive element.

8. The apparatus of claim 7, wherein the first and second reactive elements are electrically connected to the first tuning element such that the first and second reactive elements form a portion of the filter circuit.

9. The apparatus of claim 1, wherein the electrically conductive body is configured to generate the second magnetic field in response to eddy currents induced in the electrically conductive body in response to coupling to the first magnetic field.

10. The apparatus of claim 1, wherein the electrically conductive body defines a slot that extends from the opening to a periphery of the electrically conductive body.

11. The apparatus of claim 10, wherein the capacitor is electrically connected between a first node on a first side of the slot and a second node on a second side of the slot.

12. The apparatus of claim 11, wherein the capacitor is a first capacitor and wherein the apparatus further comprises a second capacitor electrically connected between the first node and the electrically conductive coil.

13. The apparatus of claim 12, further comprising a third capacitor electrically connected between the second node and the electrically conductive coil.

14. The apparatus of claim 13, further comprising a fourth capacitor electrically connected to the electrically conductive coil.

15. The apparatus of claim 1, further comprising a second tuning element electrically connected to the electrically conductive coil to define a circuit having a resonant frequency substantially equal to a resonant frequency of the resonant circuit formed by the electrically conductive body and the first tuning element.

16. The apparatus of claim 1, further comprising a second tuning element electrically connected to the electrically conductive coil to define a circuit having a resonant frequency different from a resonant frequency of the resonant circuit formed by the electrically conductive body and the first tuning element.

17. The apparatus of claim 1, further comprising a metallic enclosure configured to house the electronic components, the metallic enclosure comprising the electrically conductive body.

18. The apparatus of claim 1, wherein the first tuning element further comprises an inductor electrically connected to the capacitor.

19. The apparatus of claim 1, wherein the capacitor comprises a variable capacitor.

20. An apparatus for wirelessly receiving power, the apparatus comprising:
   a housing configured to enclose electronic components of the apparatus, the housing comprising a metallic sheet having a shape that defines an opening therethrough and a slot extending from the opening to a periphery of the metallic sheet;
   a first tuning element electrically connected between a first node on the metallic sheet positioned on a first side of the slot and a second node on the metallic sheet on a second side of the slot, the metallic sheet having a shape that allows a first flow of current to be induced therein in response to being magnetically coupled to a first magnetic field;
   an electrically conductive coil wound about the opening and configured such that a second flow of current will be induced in the electrically conductive coil in response to being magnetically coupled to a second magnetic field, generated by the first flow of current in the metallic sheet, to produce the second flow of current in the electrically conductive coil;
   power conversion circuitry configured to produce power from the second flow of current induced in the electrically conductive coil; and
   a filter circuit comprising the metallic sheet and the first tuning element, the filter circuit configured to filter harmonics generated by the power conversion circuitry.

21. The apparatus of claim 20, wherein the harmonics fall within a frequency band of a cellular signal received by the apparatus.

22. The apparatus of claim 20, wherein the filter circuit comprises at least one of:
   a low-pass filter having a cutoff frequency of an integer multiple of a fundamental power transfer frequency of the first magnetic field; or
   a notch filter having a center frequency of an integer multiple of the fundamental power transfer frequency.

23. The apparatus of claim 20, wherein the first tuning element comprises a first capacitor, wherein the apparatus further comprises:
   a second capacitor electrically connected between the first node and the electrically conductive coil; and
   a third capacitor electrically connected between the second node and the electrically conductive coil.

24. The apparatus of claim 23, wherein the second and third capacitor form a portion of the filter circuit.

25. The apparatus of claim 20, further comprising a second tuning element electrically connected to the electrically conductive coil to define a circuit having a resonant frequency substantially equal to a resonant frequency of a resonant circuit formed by the metallic sheet and the first tuning element.

* * * * *